United States Patent
Totani

(10) Patent No.: US 6,298,980 B1
(45) Date of Patent: Oct. 9, 2001

(54) SHEET MATERIAL ARRANGING AND FEEDING CONVEYOR

(75) Inventor: Mikio Totani, Muko (JP)

(73) Assignee: Totani Giken Kogyo Co., Ltd., Kyoto (JP)

( * ) Notice: Subject to any disclaimer, the term of this patent is extended or adjusted under 35 U.S.C. 154(b) by 0 days.

(21) Appl. No.: 09/471,404

(22) Filed: Dec. 23, 1999

(30) Foreign Application Priority Data

Dec. 25, 1998 (JP) .................................................. 10-370635

(51) Int. Cl.$^7$ .................................................. B65G 25/00
(52) U.S. Cl. ...................................... 198/803.1; 414/790.4
(58) Field of Search .............................. 198/484.1, 803.1, 198/456, 425; 414/790.1, 790.4, 788

(56) References Cited

U.S. PATENT DOCUMENTS

| | | |
|---|---|---|
| 3,902,587 | 9/1975 | Checcucci . |
| 4,824,307 | 4/1989 | Johnson et al. . |
| 5,127,209 | 7/1992 | Hunter . |
| 5,271,708 | * 12/1993 | Nagel .................................. 414/790.4 |

* cited by examiner

Primary Examiner—Kenneth W. Noland
(74) Attorney, Agent, or Firm—Armstrong, Westerman, Hattori, McLeland & Naughton, LLP

(57) ABSTRACT

There is disclosed a conveyor for arranging and feeding sheet materials such as plastic bags in a feeding direction, the sheet materials being discharged into a discharge position. The conveyor comprises first sprocket or pulley means disposed near the discharge position of sheet material. The conveyor further comprises second sprocket or pulley means disposed downstream of the first sprocket or pulley means in the feeding direction of sheet material. Endless chain or belt means is stretched between the first and second sprocket or pulley means. A plurality of receivers are spaced at a distance from each other along the endless chain or belt means and mounted on and fixed to the endless chain or belt means to extend outwardly of and vertically to the endless chain or belt means, one of the receivers being disposed at the discharge position to receive the sheet materials successively discharged. The receivers are intermittently moved by the endless chain or belt means around the first sprocket or pulley means to feed the sheet materials and make them stand, whenever a number of sheet materials are discharged into the discharge position and stacked on the receiver disposed at the discharge position. In addition, the receivers are intermittently moved by the endless chain or belt means between the first and second sprocket or pulley means to feed the sheet materials with keeping them standing, whenever the number of sheet materials are discharged into the discharge position and stacked on the receiver disposed at the discharge position.

10 Claims, 4 Drawing Sheets

SHEET MATERIAL ARRANGING AND FEEDING CONVEYOR

FIELD OF THE INVENTION

The invention relates to a conveyor for arranging and feeding sheet materials such as plastic bags discharged into a discharge position.

PRIOR ART

A bag making machine has been commercially available for successively making plastic bags. The plastic bags are successively discharged into a discharge position and stacked on a conveyor. The conveyor is intermittently driven to feed the plastic bags at a stroke, whenever a number of plastic bags are discharged into the discharge position and stacked on the conveyor. Accordingly, the conveyor can arrange the plastic bags into stacked groups and feed them group by group.

However, the conveyor is problematic, especially with respect to a standing pouch. The standing pouch is a type of plastic bag comprising a bottom portion and the other portion, the bottom portion being thicker than the other portion. In the case, the plastic bags may be disturbed and inclined when stacked, due to an accumulation of difference in thickness between the bottom portions and the other portions of the plastic bags. It is therefore required to accompany the conveyor with additional guide members for conveniently arranging and feeding the plastic bags along the guide members without breaking down. The arrangement must therefore be complicated and expensive. In addition, each of the plastic bags has a certain size which is subject to change. It is therefore required to exchange the guide members for other ones or shift them for adjustment of position in accordance with the size of plastic bag.

SUMMARY OF THE INVENTION

It is therefore an object of the invention to provide a unique and improved conveyor for arranging and feeding sheet materials such as plastic bags in a feeding direction, the sheet materials being discharged into a discharge position, to thereby overcome the above problems.

Another object of the invention is to conveniently arrange and feed the sheet materials to be stable without breaking down.

According to the invention, the conveyor comprises first sprocket or pulley means disposed near the discharge position of sheet material. The conveyor further comprises second sprocket or pulley means disposed downstream of the first sprocket or pulley means in the feeding direction of sheet material. Endless chain or belt means is stretched between the first and second sprocket or pulley means. A plurality of receivers are spaced at a distance from each other along the endless chain or belt means and mounted on and fixed to the endless chain or belt means to extend outwardly of and vertically to the endless chain or belt means, one of the receivers being disposed at the discharge position to receive the sheet materials successively discharged.

The receivers are intermittently moved by the endless chain or belt means around the first sprocket or pulley means to feed the sheet materials and make them stand, whenever a number of sheet materials are discharged into the discharge position and stacked on the receiver disposed at the discharge position. In additions the receivers are intermittently moved by the endless chain or belt means between the first and second sprocket or pulley means to feed the sheet materials with keeping them standing, whenever the number of sheet materials are discharged into the discharge position and stacked on the receiver disposed at the discharge position.

In a preferred embodiment, the conveyor further comprises third sprocket or pulley means disposed below the first sprocket or pulley means. The chain or belt means is stretched between the first, second and third sprocket or pulley means. The conveyor further comprises drive means by which the first sprocket or pulley means is reciprocatingly moved to advance outwardly of the endless chain or belt means and then retract inwardly of the endless chain or belt means, whenever the number of sheet materials are discharged into the discharge position and stacked on the receiver disposed at the discharge position. The conveyor further comprises resiliently urging means for resiliently urging the third sprocket or pulley means outwardly of the endless chain or belt means to permit the first sprocket or pulley means to advance and retract without slacking the endless chain or belt means.

The conveyor further comprises first locking means for locking the second sprocket or pulley means from rotating to rotate the first sprocket or pulley means when the first sprocket or pulley means advances outwardly of the endless chain or pulley means so that the receivers are intermittently moved by the endless chain or belt means around the first sprocket or pulley means to feed the sheet materials and make them stand. The conveyor further comprises second locking means for locking the first sprocket or pulley means from rotating to rotate the second sprocket or pulley means when the first sprocket or pulley means retracts inwardly of the endless chain or belt means so that the receivers are intermittently moved by the endless chain or belt means between the first and second sprocket or belt means to feed the sheet materials with keeping them standing.

Each of the receivers takes the form of a comb including a plurality of teeth between which a plurality of slots are formed. A plurality of rails are inserted into the slots in the receivers to extend in a direction in which the receivers are intermittently moved so that the sheet materials are engaged with the rails, stacked on the teeth and then fed along the rails. Each of the sheet materials has a certain size which is subject to change, the rails being movable along the slots in the receivers longitudinally thereof for adjustment of position in accordance with the size of sheet material.

The first sprocket or pulley means comprises a pair of first sprockets or pulleys spaced horizontally from each other. The second sprocket or pulley means comprises a pair of second sprockets or pulleys spaced horizontally from each other. The third sprocket or pulley means comprises a pair of third sprockets or pulleys spaced horizontally from each other. The endless chain or belt means comprises a pair of endless chains or belts extending parallel to each other, the endless chains or belts being stretched between the first, second and third sprockets or pulleys respectively to be spaced horizontally from each other. Each of the receivers is disposed between the endless chains or belts and mounted on a holder which has opposite ends fixed to the endless chains or belts.

The first sprocket or pulley means is mounted on a first shaft for rotation. The conveyor further comprises guide means for guiding the first shaft for movement outwardly and inwardly of the endless chain or belt means. The drive means comprises cylinder means connected to the first shaft so that the first shaft can be reciprocatingly moved along the guide means by the cylinder means.

The third sprocket or pulley means is mounted on a third shaft for rotation. The resiliently urging means comprises cylinder means connected to the third shaft to resiliently urge the third shaft outwardly of the endless chain or belt means.

The second sprocket or pulley means is mounted on and fixed to a second shaft for rotation integrally therewith. The first locking means comprises a first locking plate disposed coaxially to, mounted on and fixed to the second shaft for rotation integrally therewith. The first locking means further comprises cylinder means cooperating with the first locking plate to lock the second shaft from rotating. The first locking plate may include a plurality of notches formed therein, disposed circumferentially of the first locking plate and spaced equiangularly from each other, the cylinder being connected to a stop which is moved toward and fitted into one of the notches radially of the first locking plate by the cylinder means to lock the second shaft from rotating.

The first sprocket or pulley means is mounted on and fixed to a first shaft for rotation integrally therewith. The second locking means comprises a second locking plate disposed coaxially to, mounted on and fixed to the first shaft for rotation integrally therewith. The second locking means further comprises cylinder means cooperating with the second locking plate to lock the first shaft from rotating. The second locking plate may include a plurality of projections extending axially thereof, disposed circumferentially of the second locking plate and spaced equiangularly from each other, the cylinder means being connected to a stop which is moved toward and engaged with two of the projections radially of the second locking plate by the cylinder means to lock the first shaft from rotating.

DETAILED DESCRIPTION OF THE PREFERRED EMBODIMENT

Figure 1:
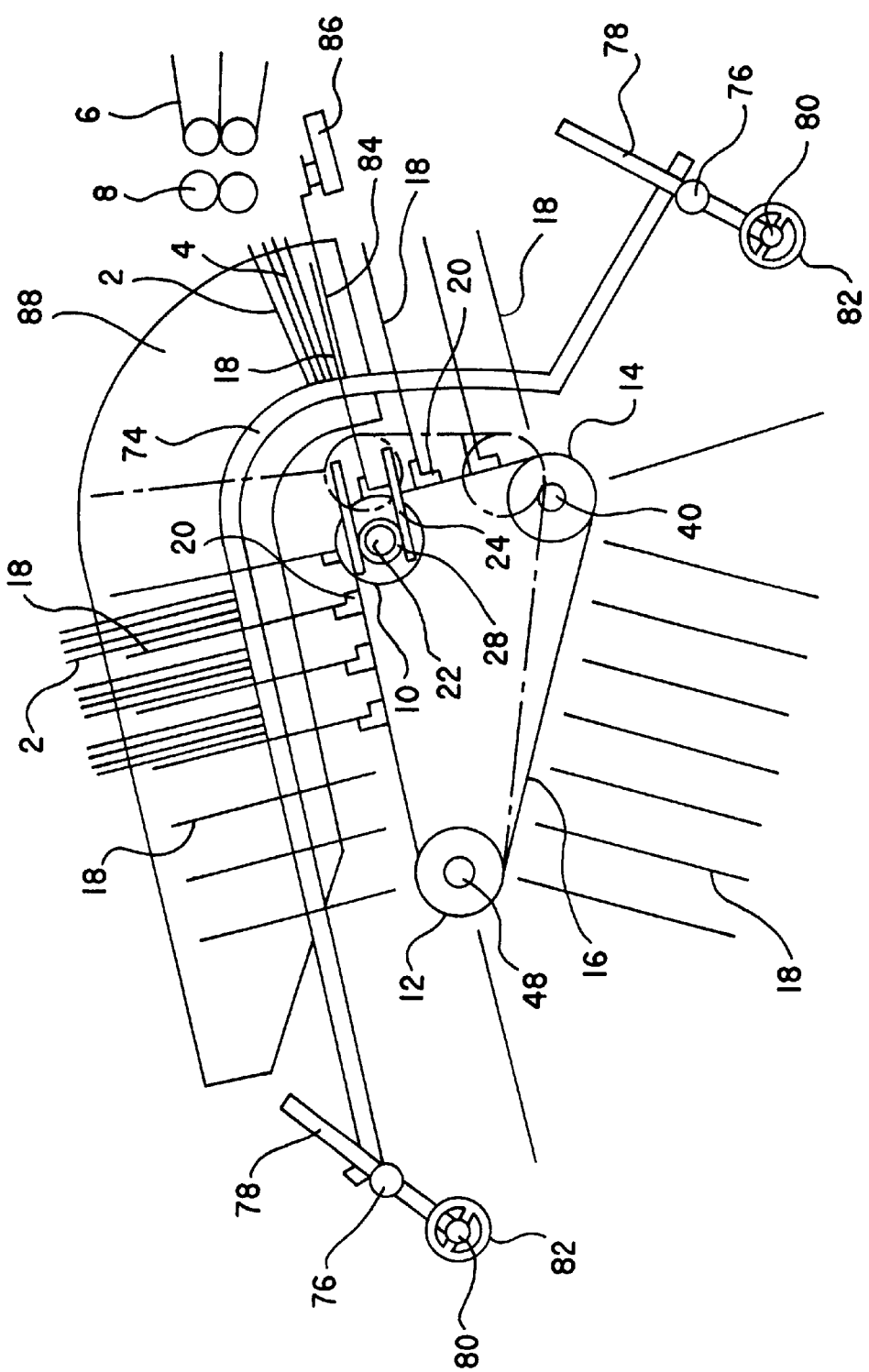
FIG. 1 is a schematic view of a preferred embodiment of the invention.

Turning now to the drawings, FIG. 1 illustrates a conveyor for arranging and feeding sheet materials such as plastic bags 2 in a feeding direction, according to the invention. The conveyor is incorporated into a bag making machine which successively makes plastic bags 2 from a web material comprising superposed layers of plastic film. The bag making machine is arranged to intermittently feed, heat seal, slit and then cut the web material to thereby successively make the plastic bags 2 two by two. The plastic bags 2 are successively discharged into a discharge position 4 in two rows by stacker belts 6 and pinch rollers 8.

The conveyor includes first sprocket means 10 disposed near and opposed to the discharge position 4 of plastic bag. The discharge position 4 is intermediate between the pinch rollers 8 and the first sprocket means 10 in the discharge direction of plastic bag. The conveyor further includes second sprocket means 12 disposed downstream of the first sprocket means 10 in the feeding direction of plastic bag which corresponds to the discharge direction of plastic bag. The conveyor further includes third sprocket means 14 disposed below the first sprocket means 10. Endless chain means 16 is stretched between and engaged with the first, second and third sprocket means 10, 12 and 14. A plurality of receivers 18 are spaced at a distance from each other along the endless chain means 16 and mounted on and fixed to the endless chain means 16 to extend outwardly of and vertically to the endless chain means 16, one of the receivers 18 being disposed at the discharge position 4 and held in an inclined attitude to receive the plastic bags 2 successively discharged.

Figure 2:
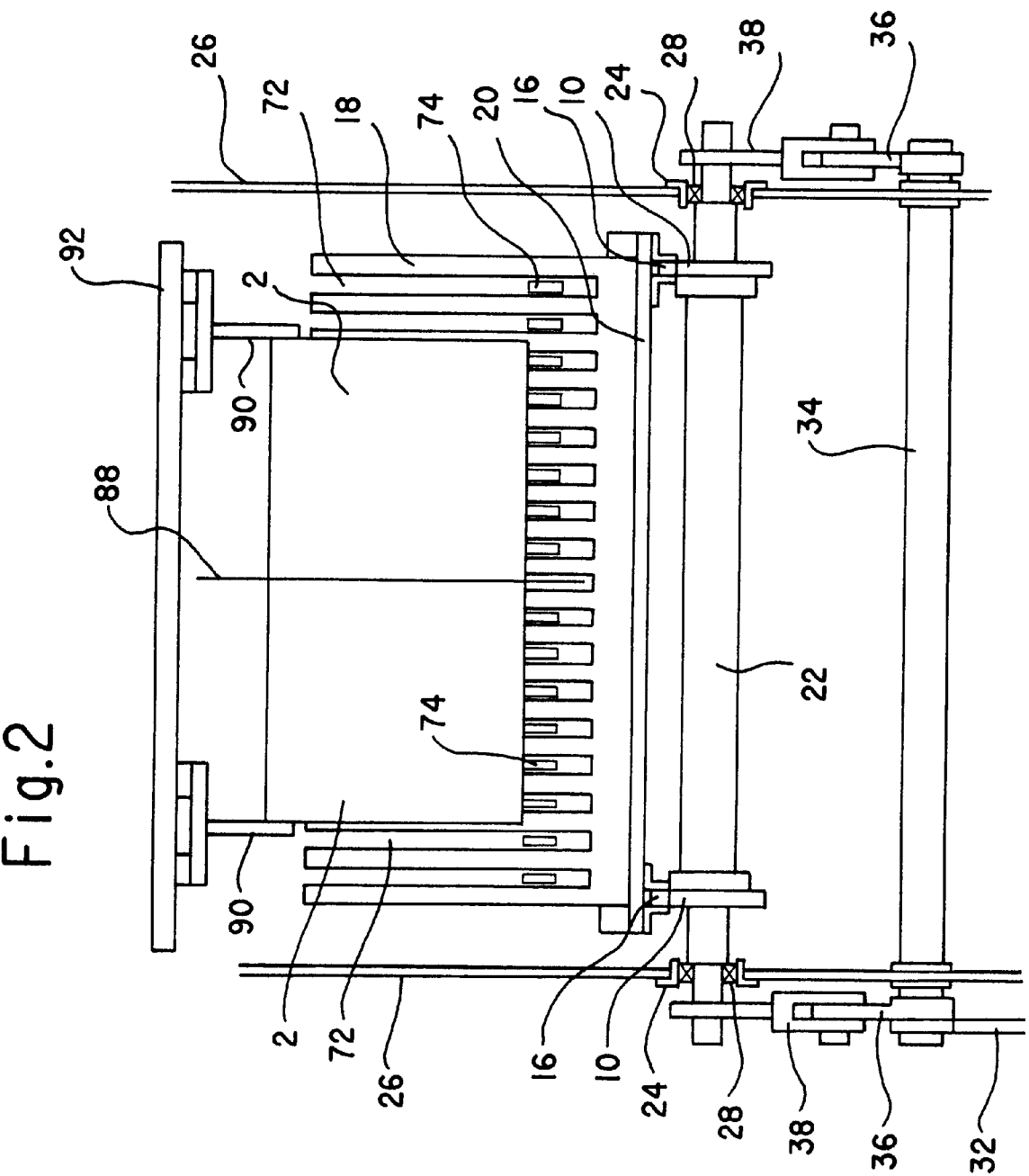
FIG. 2 is an elevational view illustrating the relative arrangement between the chains and the receiver of FIG. 1.

As to the first, second and third sprocket means 10, 12 and 14, the first sprocket means 10 comprises a pair of first sprockets spaced horizontally from each other, as shown in FIG. 2. The second sprocket means 12 comprises a pair of second sprockets spaced horizontally from each other, as in the case of the first sprocket means 10. The third sprocket means 14 also comprises a pair of third sprockets spaced horizontally from each other, as in the case of the first and second sprocket means 10 and 12. The endless chain means 16 comprises a pair of endless chains extending parallel to each other, the endless chains 16 being stretched between and engaged with the first, second and third sprockets 10, 12 and 14 respectively to be spaced horizontally from each other. Each of the receivers 18 is disposed between the endless chains 16 and mounted on a holder 20 which has opposite ends fixed to the endless chains 16.

The conveyor further includes drive means by which the first sprockets 10 are reciprocatingly moved to advance outwardly of the endless chains 16 and then retract inwardly of the endless chains 16, whenever a number of plastic bags 2 are discharged into the discharge position 4 and stacked on the receiver 18 disposed at the discharge position 4. In this connection, the first sprockets 10 are mounted on a first shaft 22 for rotation. In addition, the conveyor further includes guide means 24 comprising a pair of guide ways which are mounted on frames 26 for guiding the first shaft 22 for movement outwardly and inwardly of the endless chains 16. The first sprockets 10 are fixed to the first shaft 22 for rotation integrally therewith, the first shaft 22 including a pair of bearings 28 mounted on the opposite ends thereof and fitted into the guide ways 24, so that the first shaft 22 can be supported by the bearings 28 and guide ways 24 for rotation and movement. The guide ways 24 extend outwardly of the endless chains 16 in a direction parallel to the endless chains 16 between the first and second sprockets 10 and 12.

Figure 3:
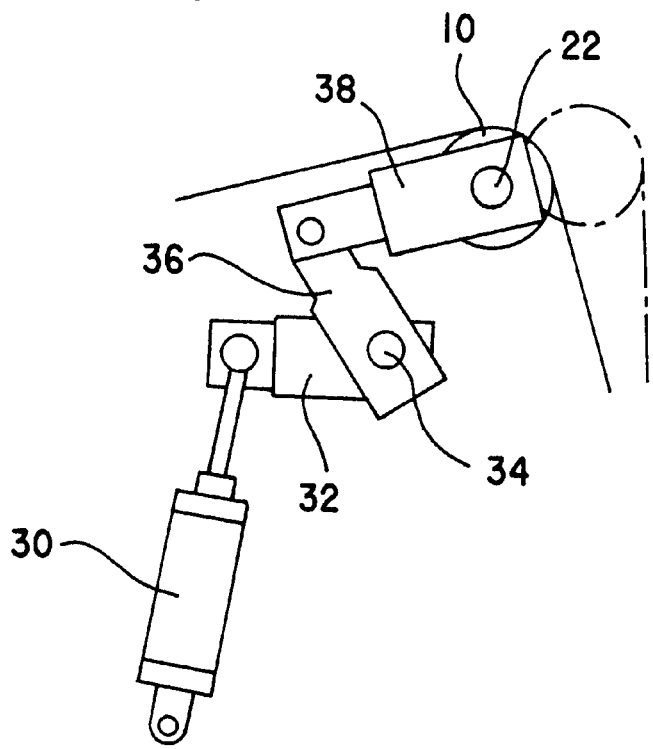
FIG. 3 is a side view of the drive means of FIG. 1.

The drive means comprises cylinder means 30 connected to the first shaft 22 so that the first shaft 22 can be reciprocatingly moved along the guide ways 24 by the cylinder means 30, as shown in FIG. 3. For example, the cylinder means 30 comprises a cylinder connected to a lever 32 which is mounted on and fixed to a transmission shaft 34. The transmission shaft 34 includes a pair of arms 36 mounted on and fixed to the opposite ends thereof. The first shaft 22 includes a pair of links 38 mounted on the opposite ends thereof, the arms 36 being connected to the links 38 respectively. The lever 32 is swingingly moved clockwise about the transmission shaft 34 in FIG. 3 by the cylinder 30 so that the arms 36 are swingingly moved integrally with the lever 32 and the transmission shaft 34, whenever the number of plastic bags 2 are discharged into the discharge position 4 and stacked on the receiver 18 disposed at the discharge position 4. The first shaft 22 is therefore pushed and moved along the guide ways 24 by the arms 36 and the links 38 so that the first sprockets 10 advance outwardly of the chains 16 and toward the discharge position 4 in the direction parallel to the endless chains 16 between the first and second sprockets 10 and 12. The lever 32 is then swingingly moved counterclockwise about the transmission shaft 34 in FIG. 3 by the cylinder 30 so that the arms 36 are swingingly moved integrally with the lever 32 and the transmission shaft 34. The first shaft 22 is therefore pulled and moved along the guide ways 24 by the arms 36 and the links 38 so that the first sprockets 10 retract inwardly of the chains 16.

Figure 4:
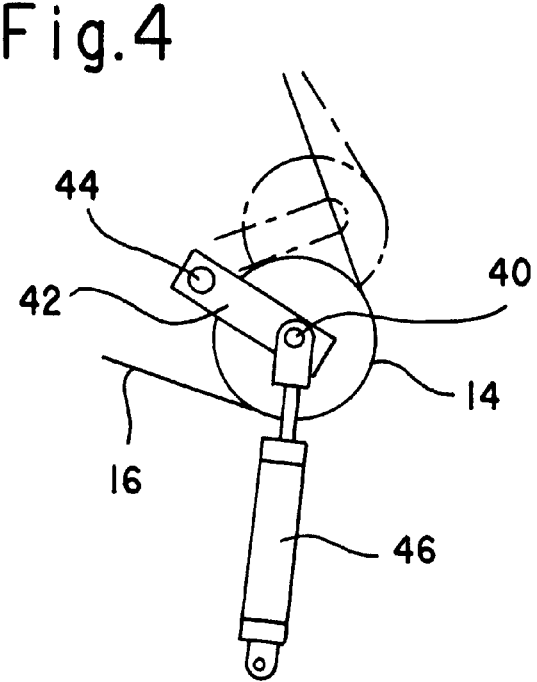
FIG. 4 is a side view of the resiliently urging means of FIG. 1.

The conveyor further includes resiliently urging means for resiliently urging the third sprockets 14 outwardly of the endless chains 16 to permit the first sprockets 10 to advance and retract without slacking the endless chains 16. In this connection, the third sprockets 14 are mounted on a third shaft 40 for rotation. The third shaft 40 has opposite ends mounted on and supported by a pair of arms 42 which are mounted on and supported by pins 44, as shown in FIG. 4. The resiliently urging means includes cylinder means 46 comprising a pair of cylinders which are connected to the opposite ends of the third shaft 40. The cylinders 46 therefore cooperate with the arms 42 swingingly moved about the pins 44 to resiliently urge the third shaft 40 and the third sprockets 14 outwardly of the endless chains 16.

Accordingly, the third sprockets 14 and the third shaft 40 are pulled by the endless chains 16 against the cylinders 46 when the first sprockets 10 advance outwardly of the endless chains 16. The arms 42 are swingingly moved counterclockwise about the pins 44 in FIG. 4 so that the third sprockets 14 retract inwardly of the endless chains 16 to permit the first sprockets 10 to advance outwardly of the endless chains 16. The third sprockets 14 and the third shaft 40 are then pulled by the cylinders 46 when the first sprockets 10 retract inwardly of the endless chains 16. The arms 42 are swingingly moved clockwise about the pins 44 in FIG. 4 so that the third sprockets 14 advance outwardly of the endless chains 16 to permit the first sprockets 10 to retract inwardly of the endless chains 16 without slacking the endless chains 16.

Figure 5:
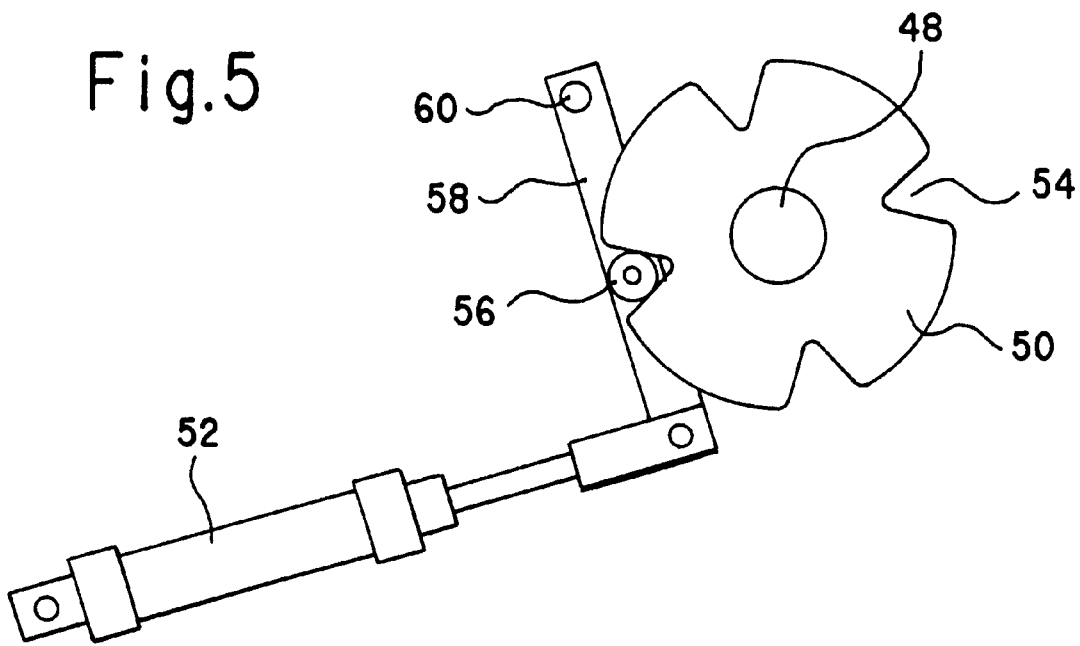
FIG. 5 is a side view of the first locking means of FIG. 1.

The conveyor further includes first locking means for locking the second sprockets 12 from rotating to rotate the first sprockets 10 when the first sprockets 10 advance outwardly of the endless chains 16. In this connection, the second sprockets 12 are mounted on and fixed to a second shaft 48 for rotation integrally therewith. The first locking means includes a first locking plate 50 disposed coaxially to, mounted on and fixed to the second shaft 48 for rotation integrally therewith, as shown in FIG. 5. The first locking means further includes cylinder means 52 cooperating with the first locking plate 50 to lock the second shaft 48 from rotating.

For example, the first locking plate 50 includes a plurality of notches 54 formed therein, disposed circumferentially of the first locking plate 50 and spaced equiangularly from each other. The cylinder means 52 comprises a cylinder which is connected to a stop 56 comprising a roller. The roller 56 is moved toward and fitted into one of the notches 54 radially of the first locking plate 50 by the cylinder 52. In the embodiment, the roller 56 is opposed to the circumference of the first locking plate 50 and mounted on an arm 58 for rotation. The arm 58 is mounted on and supported by a pin 60 at one end, the cylinder 52 being connected to the other end of the arm 58. The arm 58 is swingingly moved counterclockwise about the pin 60 in FIG. 5 by the cylinder 52 so that the roller 56 is moved toward and fitted into one of the notches 54 radially of the first locking plate 50 to lock the second shaft 48 from rotating.

Figure 6:
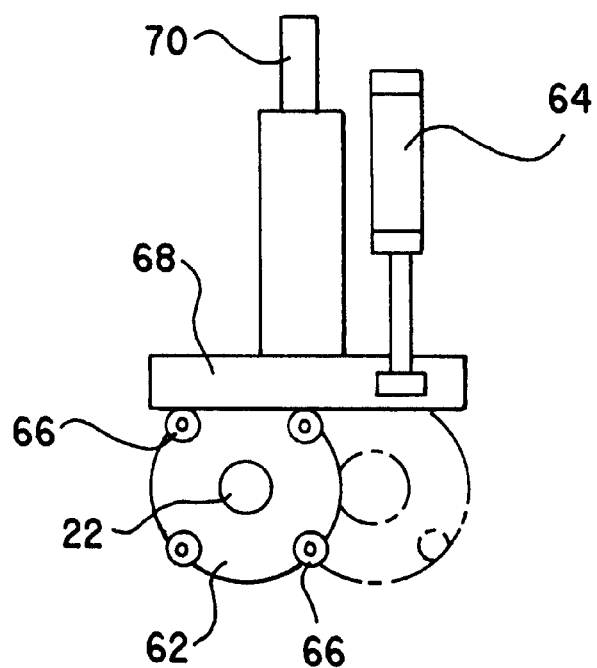
FIG. 6 is a side view of the second locking means of FIG. 1.

The conveyor further includes second locking means for locking the first sprockets 10 from rotating to rotate the second sprockets 12 when the first sprockets 10 retract inwardly of the endless chains 16. The second locking means includes a second locking plate 62 disposed coaxially to, mounted on and fixed to the first shaft 22 for rotation integrally therewith, as shown in FIG. 6. The second locking means further includes cylinder means 64 cooperating with the second locking plate 62 to lock the first shaft 22 from rotating.

For example, the second locking plate 62 includes a plurality of projections 66 comprising rollers, extending axially of the second locking plate 62, disposed circumferentially of the second locking plate 62 and spaced equiangularly from each other. The cylinder means 64 comprises a cylinder which is connected to a stop 68 comprising an elongated member and extending in a direction in which the first sprockets 10 advance and retract. The member 68 is opposed to the rollers 66 of the second locking plate 62 and mounted on a rod 70 for movement. The rod 70 extends vertically to the member 68 so that the member 68 can be moved toward and engaged with two of the rollers 66 radially of the second locking plate 62 by the cylinder 64 to lock the first shaft 22 from rotating.

As to the receivers 18, each of the receivers 18 takes the form of a comb including a plurality of teeth between which a plurality of slots 72 are formed. A plurality of rails 74 are inserted in the slots 72 in the receivers 18 to extend in a direction in which the receivers 18 are intermittently moved. The rails 74 are movable along the slots 72 in the receivers 18 longitudinally thereof for adjustment of position. For example, the rails 74 have opposite ends mounted on and supported by a pair of rods 76 with which feed screws 78 are threadedly engaged. A pair of shafts 80 are connected to the feed screws 78 through gears. A pair of handles 82 are mounted on and fixed to the shafts 80 to rotate the shafts 80 and the feed screws 78 so that the rails 74 can be moved integrally with the rods 76 by the feed screws 78 and along the slots 72 in the receivers 18 longitudinally thereof.

In addition, the conveyor includes a shutter 84 disposed at the discharge position 4 of plastic bag and held in an attitude, as in the case of the receiver 18. The shutter 84 takes the form of a comb which is inserted into the slots 72 and mounted on a holder 86 for movement to be engaged with and moved by the rails 74. The conveyor further includes a partition 88 disposed at the center of the receivers 18 and inserted in the slots 72 thereof. The partition 88 extends in a direction in which the receivers 18 are intermittently moved. A pair of side plates 90 are disposed on the opposite sides of the partition 88 and mounted on a holder 92 so that spaces are formed between the side plates 90 and the partition 88 for the plastic bags 2. The side plates 90 can be moved along the holder 92 widthwise of the plastic bags 2 for adjustment of position.

Accordingly, in the conveyor, the plastic bags 2 are successively discharged into the discharge position 4 in two rows and directed into spaces between the side plates 90 and the partition 88. The stacker belts 6 extend slightly obliquely to each other so that the plastic bags 2 can be directed into the spaces between the side plates 90 and the partition 88. The plastic bags 2 are therefore engaged with and stopped by the rails 74, dropped along the rails 74 and held and stacked on the teeth of the receiver 18 which is disposed at the discharge position 4.

The first sprocket 10 and the first shaft 22 are then pushed and moved along the guide ways 24 by the cylinder 30 when the number of plastic bags 2 are discharged into the discharge position 4 and stacked on the receiver 18 disposed at the discharge position 4. The first sprockets 10 therefore advance outwardly of the chains 16 and toward the discharge position 4 in the direction parallel to the endless chains 16 between the first and second sprockets 10 and 12. The third sprockets 14 are pulled by the endless chains 16 against the cylinder 46 when the first sprockets 10 advance outwardly of the endless chains 16. The third sprockets 14 therefore retract inwardly of the endless chains 16 to permit the first sprockets 10 to advance outwardly of the endless chains 16.

In addition, the arm 58 is swingingly moved counterclockwise about the pin 60 in FIG. 5 by the cylinder 52 before the first sprockets 10 advance outwardly of the endless chains 16. The roller 56 is therefore moved toward and fitted into one of the notches 54 in the first locking plate 50 by the cylinder 52 to lock the second shaft 48 and the second sprockets 12 from rotating when the first sprockets 10 advance outwardly of the endless chains 16. Accordingly, the endless chains 16 are pulled by the first sprockets 10 to generate a reaction which rotates the first sprockets 10 in accordance with the increase in distance between the first and second sprockets 10 and 12. The receiver 18 is therefore moved by the endless chains 16 around the first sprockets 10 to feed the plastic bags 2. The plastic bags 2 are lifted by the receiver 18 along the rails 74. In the embodiment, the first sprockets 10 advance for a predetermined distance to rotate it through an angle of 90°. The receiver 18 is therefore moved through an angle of 90° around the first sprockets 10 to feed the plastic bags 2 onto the upper side of the first sprockets 10 and make them stand on the rails 74.

In the meantime, the next receiver 18 is moved by the endless chains 16 toward the discharge position 4. In this connection, the receivers 18 are moved for a length which corresponds to the distance or pitch at which the receivers 18 are spaced. The next receiver 18 is therefore disposed at the discharge position 4 on completing the movement. As to the plastic bags 2 discharged into the discharge position 4 before the next receiver 18 is disposed at the discharge position 4, the plastic bags 2 are engaged with and dropped along the rails 74 to be held on the shutter 84. The next receiver 18 is then moved into the discharge position 4 so that the plastic bags 2 are lifted from the shutter 84 by the next receiver 18 to be held on the next receiver 18.

The first sprockets 10 are then pulled and moved along the guide ways 24 by the cylinder 30 to retract inwardly of the endless chains 16. The third sprockets 14 are pulled by the cylinders 46 when the first sprockets 10 retract inwardly of the endless chains 16. The third sprockets 14 therefore advance outwardly of the endless chains 16 to permit the first sprockets 10 to retract inwardly of the endless chains 16 without slacking the endless chains 16.

In addition, the arm 58 is swingingly moved clockwise about the pin 60 in FIG. 5 by the cylinder 52 before the first sprockets 10 retract inwardly of the endless chains 16. The roller 56 is therefore moved and disengaged from the notch 54 in the first locking plate 50 by the cylinder 52 to unlock the second sprockets 12 for rotation. At the same time the member 68 is moved toward and engaged with two of the rollers 66 of the second locking plate 62 by the cylinder 64 to lock the first shaft 22 and the first sprockets 10 from rotating when the first sprockets 10 retract inwardly of the endless chains 16. The first sprockets 10 are moved along the guide ways 24 and the member 68 to retract inwardly of the endless chains 16. The member 68 is kept being engaged with the rollers 66 to lock the first sprockets 10 from rotating while the first sprockets 10 retract inwardly of the endless chains 16. Accordingly, the endless chains 16 are pulled by the third sprockets 14 advancing outwardly of the endless chains 16 to rotate the second sprockets 12 in accordance with the decrease in distance between the first and second sprockets 10 and 12. The receiver 18 is therefore intermittently moved by the endless chains 16 between the first and second sprockets 10 and 12 to feed the plastic bags 2. The plastic bags 2 are moved by the receiver 18 along the rails 74, the receiver 18 cooperating with the rails 74 to keep the plastic bags 2 standing. The first sprockets 10 retract for the predetermined distance to rotate the second sprockets 12 through an angle of 90°.

The member 68 is then moved and disengaged from the rollers 66 of the second locking plate 62 by the cylinder 64 to unlock the first sprockets 10 for rotation before the number of plastic bags 2 are discharged into the discharge position 4 and stacked on the next receiver 18 disposed at the discharge position 4. At the same time, the arm 58 is swingingly moved counterclockwise about the pin 60 in FIG. 5 by the cylinder 52. In this connection, the first locking plate 50 includes four notches 54 disposed circumferentially thereof and spaced equiangularly from each other, the first locking plate 50 rotating integrally with the second sprockets 12 and through an angle of 90°. The roller 56 can therefore be moved toward and fitted into another notch 54 in the first locking plate 50 by the cylinder 52 to lock the second sprockets 12 from rotating.

The first sprockets 10 then advance outwardly of the endless chains 16 again to rotate it through an angle of 90° in accordance with the increase in distance between the first and second sprockets 10 and 12. The receiver 18 is therefore moved by the endless chains 16 around the first sprockets 10 to feed the plastic bags 2 onto the upper side of the first sprockets 10 and make them stand on the rails 74. The arm 58 is then swingingly moved by the cylinder 52 so that the roller 56 is moved and disengaged from the notch 54 in the first locking plate 50 to unlock the second sprockets 12 for rotation. At the same time, the member 68 is moved toward the rollers 66 of the second locking plate 62 by the cylinder 64. In this connection, the second locking plate 62 includes four rollers 66 disposed circumferentially thereof and spaced equiangularly from each other, the second locking plate 62 rotating integrally with the first sprockets 10 and through an angle of 90°. The member 68 can therefore be moved toward and engaged with two of the rollers 66 of the second locking plate 62 by the cylinder 64 to lock the first sprockets 10 from rotating.

The first sprockets 10 then retract inwardly of the endless chains 16 again to rotate the second sprockets 12 through an angle of 90° in accordance with the decrease in distance between the first and second sprockets 10 and 12. The receiver 18 is therefore moved by the endless chains 16 between the first and second sprockets 10 and 12 to feed the plastic bags 2.

Accordingly, the receivers 18 can be intermittently moved by the endless chains 16 around the first sprockets 10 to feed the plastic bags 2 and make them stand whenever the number of plastic bags 2 are discharged into the discharge position 4 and stacked on the receiver 18 disposed at the discharge position 4. The receivers 18 are then intermittently moved by the endless chains 16 between the first and second sprockets 10 and 12 to feed the plastic bags 2 while keeping them standing whenever the number of plastic bags 2 are discharged into the discharge position 4 and stacked on the receiver 18.

The conveyor can therefore conveniently arrange the plastic bags 2 by making them stand on the rails 74. Even if the plastic bags 2 comprise standing pouches including bottom portions and the other portions, the bottom being thicker than the other portions, the conveyor can conveniently arrange the plastic bags 2 irrespectively of difference in thickness between the bottom portions and the other portions of the plastic bags. The conveyor then feeds the plastic bags 2 while keeping them standing between the first and second sprockets 10 and 12 at a speed which can be relatively low so that an operator or autohand can take out the plastic bags 2 from the conveyor without difficulty.

As to the plastic bags 2 discharged into the discharge position 4, each of the plastic bags 2 has a certain size which may be subject to change. In the case, the rails 74 can be conveniently moved along the slots 72 in the receivers 18 longitudinally thereof for adjustment of position in accordance with the size of plastic bag 2. The side plates 90 can also be moved along the holder 92 widthwise of the plastic bags 2 for adjustment in accordance with the size of plastic bag 2.

Endless belt means may be substituted for the endless chain means 16 and stretched between and engaged with not the first, second and third sprocket means 10, 12 and 14 but first, second and third pulley means so that the receivers 18 can be intermittently moved by the endless belt means. The endless belt means may comprise timing belt means which are stretched between and engaged with the first, second and third pulley means comprising timing pulley means respectively. Other resiliently urging means such as springs may be substituted for the cylinders 46 to resiliently urge the third sprocket or pulley means 14 outwardly of the endless chain or belt means 16. The conveyor may arrange and feed sheet materials other than the plastic bags 2.

What is claimed is:

1. A conveyor for arranging and feeding sheet materials such as plastic bags in a feeding direction, said sheet materials being successively discharged into a discharge position, said conveyor comprising:

first sprocket or pulley means disposed near said discharge position;

second sprocket or pulley means disposed downstream of said first sprocket or pulley means in said feeding directions;

endless chain or belt means stretched between said first and second sprocket or pulley means;

a plurality of receivers spaced at a distance from each other along said endless chain or belt means and mounted on and fixed to said endless chain or belt means to extend outwardly of and vertically to said endless chain or belt means, one of said receivers being disposed at said discharge position to receive said sheet materials successively discharged, said receivers being intermittently moved by said endless chain or belt means around said first sprocket or pulley means to feed said sheet materials and make them stand whenever a number of sheet materials are discharged into said discharge position and stacked on the receiver disposed at said discharge position, said receivers being intermittently moved by said endless chain or belt means between said first and second sprocket or pulley means to feed said sheet materials while keeping them standing whenever the number of sheet materials are discharged into said discharge position and stacked on the receiver disposed at said discharge position; and each of said receivers taking the form of a comb including a plurality of teeth between which a plurality of slots are formed, a plurality of rails being inserted into said slots in said receivers to extend in a direction in which said receivers are intermittently moved so that said sheet materials are engaged with said rails, stacked on said teeth and then fed along said rails, each of said sheet materials having a certain size which is subject to change, said rails being movable along said slots in said receivers longitudinally thereof for adjustment of position in accordance with said size of sheet material.

2. A conveyor for arranging and feeding sheet materials such as plastic bags in a feeding direction, said sheet materials being successively discharged into a discharge position, said conveyor comprising:

first sprocket or pulley means disposed near said discharge position;

second sprocket or pulley means disposed downstream of said first sprocket or pulley means in said feeding direction;

third sprocket or pulley means disposed below said first sprocket or pulley means;

endless chain or belt means stretched between said first, second and third sprocket or pulley means;

a plurality of receivers spaced at a distance from each other along said endless chain or belt means and mounted on and fixed to said endless chain or belt means to extend outwardly of and vertically to said endless chain or belt means, one of said receivers being disposed at said discharge position to receive said sheet materials successively discharged;

drive means by which said first sprocket or pulley means is reciprocatingly moved to advance outwardly of said endless chain or belt means and then retract inwardly of said endless chain or belt means whenever a number of sheet materials are discharged into said discharge position and stacked on said receiver disposed at said discharge position;

resiliently urging means for resiliently urging said third sprocket or pulley means outwardly of said endless chain or belt means to permit said first sprocket or pulley means to advance and retract without slacking said endless chain or belt means;

first locking means for locking said second sprocket or pulley means from rotating to rotate said first sprocket or pulley means when said first sprocket or pulley means advances outwardly of said endless chain or pulley means so that said receivers are intermittently moved by said endless chain or belt means around said first sprocket or pulley means to feed said sheet materials and make them stand; and second locking means for locking said first sprocket or pulley means from rotating to rotate said second sprocket or pulley means when said first sprocket or pulley means retracts inwardly of said endless chain or belt means so that said receivers are intermittently moved by said endless chain or belt means between said first and second sprocket or belt means to feed said sheet materials with keeping them standing.

3. The conveyor as set forth in claim 2 wherein each of said receivers takes the form of comb including a plurality of teeth between which a plurality of slots are formed, a plurality of rails being inserted into said slots in said receivers to extend in a direction in which said receivers are intermittently moved so that said sheet materials are engaged with said rails, stacked on said teeth and then fed along said rails, each of said sheet materials having a certain size which is subject to change, said rails being movable along said slots in said receivers longitudinally thereof for adjustment of position in accordance with said size of sheet material.

4. The conveyor as set forth in claim 2 wherein said first sprocket or pulley means comprises a pair of first sprockets or pulleys spaced horizontally from each other, said second sprocket or pulley means comprising a pair of second sprockets or pulleys spaced horizontally from each other, said third sprocket or pulley means comprising a pair of third sprockets or pulleys spaced horizontally from each other, said endless chain or belt means comprising a pair of endless chains or belts extending parallel to each other, said endless chains or belts being stretched between said first, second and third sprockets or pulleys respectively to be spaced horizontally from each other, each of said receivers being disposed between said endless chains or belts and mounted on a holder which has opposite ends fixed to said endless chains or belts.

5. The conveyor as set forth in claim 2 wherein said first sprocket or pulley means is mounted on a first shaft for rotation, and further comprising guide means for guiding said first shaft for movement outwardly and inwardly of said endless chain or belt means, said drive means comprising cylinder means connected to said first shaft which is reciprocatingly moved along said guide means by said cylinder means.

6. The conveyor as set forth in claim 2 wherein said third sprocket or pulley means is mounted on a third shaft for rotation, said resiliently urging means comprising cylinder means connected to said third shaft to resiliently urge said third shaft outwardly of said endless chain or belt means.

7. The conveyor as set forth in claim 2 wherein said second sprocket or pulley means is mounted on and fixed to a second shaft for rotation integrally therewith, said first locking means comprising a first locking plate disposed coaxially to, mounted on and fixed to said second shaft for rotation integrally therewith, said first locking means further comprising cylinder means cooperating with said first locking plate to lock said second shaft from rotating.

8. The conveyor as set forth in claim 7 wherein said first locking plate includes a plurality of notches formed therein, disposed circumferentially of said first locking plate and spaced equiangularly from each other, said cylinder means being connected to a stop which is moved toward and fitted into one of said notches radially of said first locking plate by said cylinder means to lock said second shaft from rotating.

9. The conveyor as set forth in claim 2 wherein said first sprocket or pulley means is mounted on and fixed to a first shaft for rotation integrally therewith, said second locking means comprising a second locking plate disposed coaxially to, mounted on and fixed to said first shaft for rotation integrally therewith, said second locking means further comprising cylinder means cooperating with said second locking plate to lock said first shaft from rotating.

10. The conveyor as set forth in claim 9 wherein said second locking plate includes a plurality of projections extending axially thereof, disposed circumferentially of said second locking plate and spaced equiangularly from each other, said cylinder means being connected to a stop which is moved toward and engaged with two of said projections radially of said second locking plate by said cylinder means to lock said first shaft from rotating.

* * * * *